US011163431B2

(12) United States Patent
Zent et al.

(10) Patent No.: US 11,163,431 B2
(45) Date of Patent: *Nov. 2, 2021

(54) ENABLING AND DISABLING ONE-CLICK CLAUSES

(71) Applicant: Foxwordy Inc., San Carlos, CA (US)

(72) Inventors: Monica Zent, Sunnyvale, CA (US); Khanh Nguyen, San Jose, CA (US)

(73) Assignee: Foxwordy Inc., San Carlos, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/716,430

(22) Filed: Dec. 16, 2019

(65) Prior Publication Data

US 2020/0117345 A1 Apr. 16, 2020

Related U.S. Application Data

(63) Continuation of application No. 15/902,981, filed on Feb. 22, 2018, now Pat. No. 10,545,646.

(60) Provisional application No. 62/462,295, filed on Feb. 22, 2017.

(51) Int. Cl.
| | | |
|---|---|---|
| *G06F 3/0484* | (2013.01) | |
| *G06F 3/0485* | (2013.01) | |
| *H04L 29/06* | (2006.01) | |
| *G06F 40/131* | (2020.01) | |
| *G06F 40/166* | (2020.01) | |

(Continued)

(52) U.S. Cl.
CPC ........ *G06F 3/04842* (2013.01); *G06F 3/0485* (2013.01); *G06F 40/131* (2020.01); *G06F 40/166* (2020.01); *G06F 40/197* (2020.01); *H04L 65/4015* (2013.01); *G06Q 10/101* (2013.01)

(58) Field of Classification Search
CPC .... G06F 15/16; G06F 3/04812; G06F 3/0484; G06F 11/36; G06F 17/60; G06F 3/0485; G06F 3/04842; G06F 40/131; G06F 40/166; G06F 40/197; G06Q 30/30; G06Q 10/101; H04L 29/06; H04L 65/4015

See application file for complete search history.

(56) References Cited

U.S. PATENT DOCUMENTS

| | | |
|---|---|---|
| 8,131,649 B2 | 3/2012 | Yen et al. |
| 8,793,220 B2 | 7/2014 | Peairs et al. |
| 9,418,056 B2 | 8/2016 | Greenberg et al. |

(Continued)

OTHER PUBLICATIONS

United States Office Action, U.S. Appl. No. 15/902,981, dated Apr. 2, 2019, 11 pages.

*Primary Examiner* — Steven P Sax
(74) *Attorney, Agent, or Firm* — Fenwick & West LLP

(57) ABSTRACT

A collaboration server enables users that are members of a network to upload, access, and edit clauses. The server provides, for viewing to a user, a clause on a user interface. In addition, the server can provide a one-click feature on the user interface that, when selected by a user, copies the clause while maintaining the formatting of the clause. When an additional user edits the clause, an updated version of the clause can be provided for viewing on an updated user interface. Here, the server disables the one-click feature of the prior version of the clause and provides a new one-click feature for the updated version of the clause. Therefore, each user that has access to the clause can avoid mistakenly working with an outdated version of the clause.

20 Claims, 6 Drawing Sheets

(51) Int. Cl.
  *G06F 40/197* (2020.01)
  *G06Q 10/10* (2012.01)

(56) References Cited

U.S. PATENT DOCUMENTS

| | | |
|---|---|---|
| 9,582,777 B2 * | 2/2017 | Zimmerman ....... G06F 21/6227 |
| 9,978,042 B2 | 5/2018 | Hull et al. |
| 10,056,077 B2 * | 8/2018 | Cerra .................... G10L 15/183 |
| 10,366,429 B2 | 7/2019 | Isaacson et al. |
| 2003/0101086 A1 | 5/2003 | San Miguel |
| 2007/0208815 A1 | 9/2007 | Jania et al. |
| 2009/0150789 A1 | 6/2009 | Regnier |
| 2009/0282396 A1 | 11/2009 | Boyer et al. |
| 2010/0251142 A1 * | 9/2010 | Geppert .................. H04W 4/21 715/758 |
| 2011/0010340 A1 | 1/2011 | Hung et al. |
| 2011/0289106 A1 * | 11/2011 | Rankin, Jr. ........... G06F 16/284 707/769 |
| 2012/0233209 A1 * | 9/2012 | Cheng ..................... G06F 16/22 707/770 |
| 2012/0297363 A1 * | 11/2012 | Perisic ...................... G06F 8/71 717/122 |
| 2013/0219268 A1 * | 8/2013 | Straten ................ G06F 11/0781 715/256 |
| 2013/0262269 A1 * | 10/2013 | O'Leary ................ G06Q 10/08 705/26.81 |
| 2013/0332857 A1 | 12/2013 | Kim et al. |
| 2014/0095456 A1 | 4/2014 | Pidduck |
| 2014/0280204 A1 * | 9/2014 | Avery ................. G06F 16/3334 707/748 |
| 2015/0058717 A1 * | 2/2015 | Tanaka .................. G06F 3/0483 715/256 |
| 2017/0132123 A1 | 5/2017 | DiTullio et al. |
| 2017/0220546 A1 * | 8/2017 | Codrington ........... G06F 3/0484 |

* cited by examiner

ENABLING AND DISABLING ONE-CLICK CLAUSES

CROSS-REFERENCE TO RELATED APPLICATIONS

This application is a continuation of U.S. patent application Ser. No. 15/902,981 filed on Feb. 22, 2018, which claims the benefit of Provisional U.S. Application No. 62/462,295, filed on Feb. 22, 2017, all of which are incorporated herein by reference.

TECHNICAL FIELD

The disclosure generally relates to presentation of content, and more specifically to editing options for users collaborating on a clause.

BACKGROUND

Users often work together on shared files, such as shared clauses. However, as users continuously edit shared files, the varying versions of the shared files can create a frustrating user experience as users can unknowingly operate on an earlier version of a file. As one example, conventional systems often employ uniform functionality across different versions of the same file. Therefore, a user can activate a functionality on an older version of a file when intending to work with the most up-to-date file.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
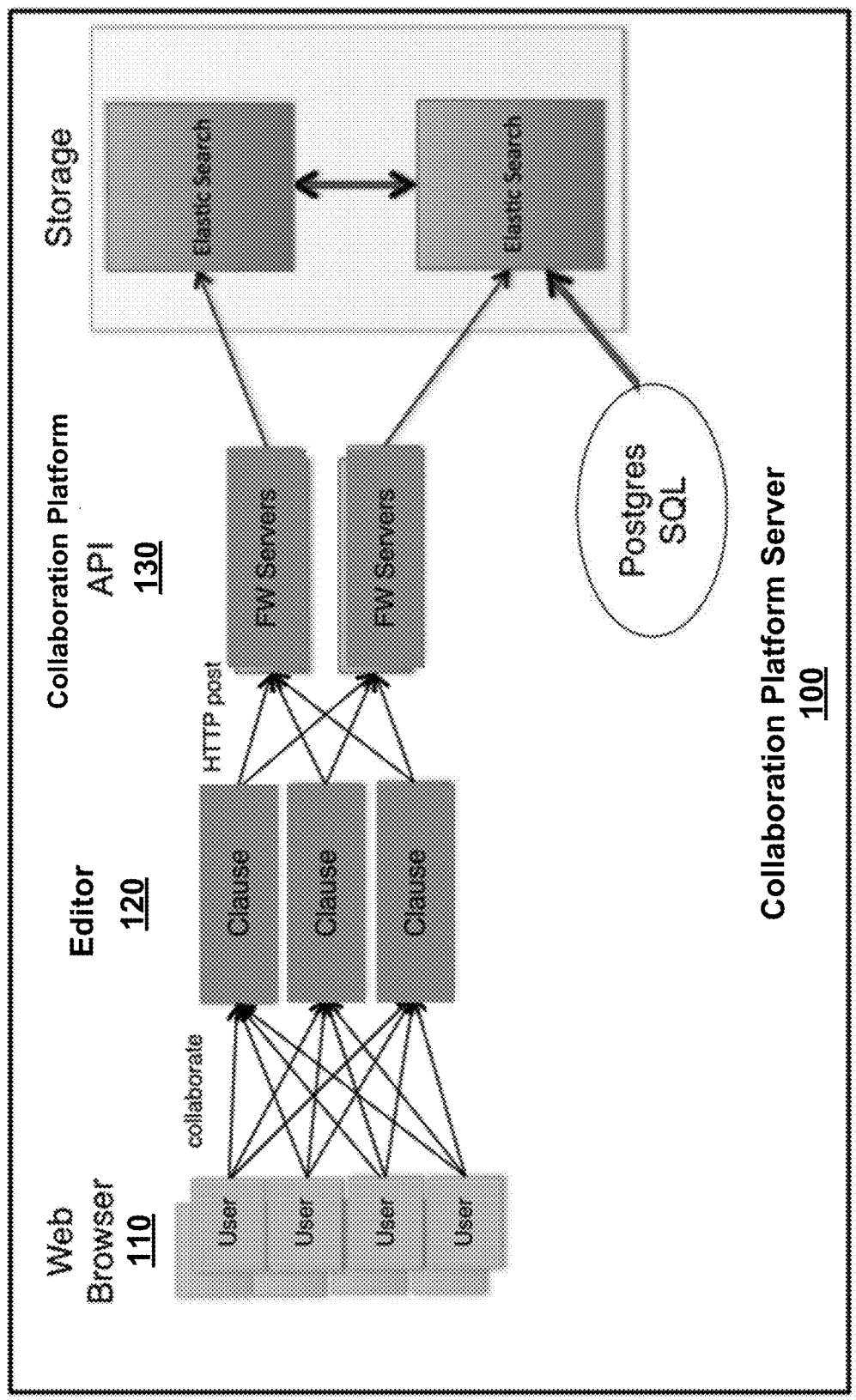
FIG. 1 depicts the overall architecture including the collaboration platform server, in accordance with an embodiment.

The Figures and the following description relate to preferred embodiments by way of illustration only. It should be noted that from the following discussion, alternative embodiments of the structure and methods disclosed herein will be readily recognized as viable alternatives that may be employed without departing from the principles of what is claimed.

Reference will now be made in detail to several embodiments, examples of which are illustrated in the accompanying figures. It is noted that whenever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The collaboration platform may be a private collaboration platform for users such as lawyers. Although the following disclosure refers specifically to the "collaboration platform server," the disclosure relates to any type of collaboration platform, e.g., for a vertical industry. The collaboration platform provides a seamless solution to help multiple users work together on a single clause, hereafter referred to as clause collaboration. A clause may be uploaded by a first user to a network (e.g., a pre-designated team or organization on the server). In various embodiments, other users that access and modify the uploaded clause are in the same network. Such a network can be referred to as a default network. Default networks are further described in U.S. application Ser. No. 14/188,586, filed on Feb. 24, 2014, which is hereby incorporated by reference in its entirety. In other embodiments, clauses can be shared across all users on the collaboration platform server. The server may also provide a full text search capability so that it's possible to look up clauses, bookmark, edit and re-use those clauses in a user's work.

In various embodiments, users can copy a clause from the collaboration platform server to any external program. The server may provide a one-click feature that may be enabled or disabled. Therefore, a user can provide a user input to activate a one-click feature. As used hereafter, a one-click feature that can be activated by a user through a single user action. For example, a user can activate the one-click feature to copy a clause from the collaboration platform by selecting the one-click feature through a single click. In various embodiments, the one-click feature is an element on a user interface. For example, the one-click feature can be a selectable button on the user interface.

In various embodiments, the one-click feature maintains all text formatting (e.g., font size, color, spacing, and the like) when the clause is copied. Therefore, the formatting of the clause is maintained when moving the clause from the collaboration platform server to the external program. In various embodiments, the one-click feature is enabled for a most up-to-date version of a clause. Additionally, the on-click feature is disabled for prior versions of a clause. This prevents users from unknowingly copying and working on a prior version of the clause that may be out of date and no longer relevant.

System Architecture

FIG. 1 depicts the overall architecture including the collaboration platform server 100, in accordance with an embodiment. Clause collaboration can be powered by the collaboration platform server 100 which may include three parts in the embodiment depicted in FIG. 1:

1. User-facing service: In various embodiments, a user can use a web browser 110 to provide or access a clause. The server may modify or format the clause using an editor 120, an example of which includes TinyMCE.
2. Collaboration platform API Service 130: When a clause is created or updated by users, an HTTP Post request is sent to the collaboration platform API Service to process the action.
3. Storage: The server store clauses. In one embodiment, the server uses PostgreSQL to store user information.

In one embodiment, the storage may employ search algorithms, such as ElasticSearch, to search and retrieve clauses.

In various embodiments, the user-facing service includes a user interface. The user interface can be built and/or updated using a library such as ReactJS. React efficiently updates and renders the appropriate component when clauses are deleted, bookmarked, or updated by users. For example, a user can modify text (e.g., align, bold text, create section breaks, add links, italicize, etc) of a clause. Additionally, there can be menu buttons that users can use to decorate or format the text. Tinymce can be used to format the structure of the clause. When a button in the clause editor is clicked, it triggers an AJAX request to the collaboration platform API Service to handle the action.

The collaboration platform API Service 130 handles actions from users such as click, edit, text changes. Each action may trigger an HTTP request to the collaboration platform API service 130. The collaboration platform API Service 130 processes actions received from the users such as: create, edit, update, change format, bookmark, delete clause, remove bookmark, search. A request that comes from the browser requires a return message, which is in JSON format. In various embodiments, there is a cluster of Web Servers with 2 nodes. The number of servers can be scaled up if there are more loads on the service.

Clauses are stored in an Elastic Search cluster. The elastic search cluster can have 2 nodes as shown in FIG. 1 but may have more or less in additional embodiments. In the depicted embodiment, if one of the node goes down, there is another for backup. The content in clauses are indexed so that users can search by certain phrase, keywords or even sentence.

Other users can see and edit a clause depends on which team, group, organization or network that the author shares with. The metadata information can be stored in PostgreSQL. The PostgresSQL server is running as RDS instance in Amazon AWS. This server can have a replicated node so if something goes wrong with the master node, the slave node will take over.

Clause Collaboration

The one-click function to post and/or edit a clause always performing on the latest version of the clause. The privilege to edit a clause is granted by the author to other users. However, all edit actions only apply to the latest version of the clause. Before the user submits a modified clause, the server will pull the latest version of that clause and make sure the user is editing on the latest version. For some cases that user doesn't have the latest version (such as if the client device that the user is accessing is disconnected from internet, laptop battery ran out, and the like), the client device will fetch the latest version and then the device makes a comparison between the new clause with the latest version. If there are any conflicts, it will prompt to the user that they are not working on the latest version. If the conflicts can be resolved by the server, it will allow the user to update the clause with the automated differences shown for the latest version.

Users within the same organization/team/network can edit all clauses shared across their organization. But the other users outside of the network do not have access to those clauses. In order to manage this relation between clauses and users, a join table can be introduced between clauses, users and organization to manage the privilege of users to a specific clause.

On the server side, each version of each clause can be stored and labeled. The difference (e.g., edits) between each version of each clause can also be stored in the database. The system allows users to perform full text search on the clauses or posts. All versions of clauses are indexed and the system allows users to search against all terms on those documents.

Example Clause Collaboration

Figure 2:
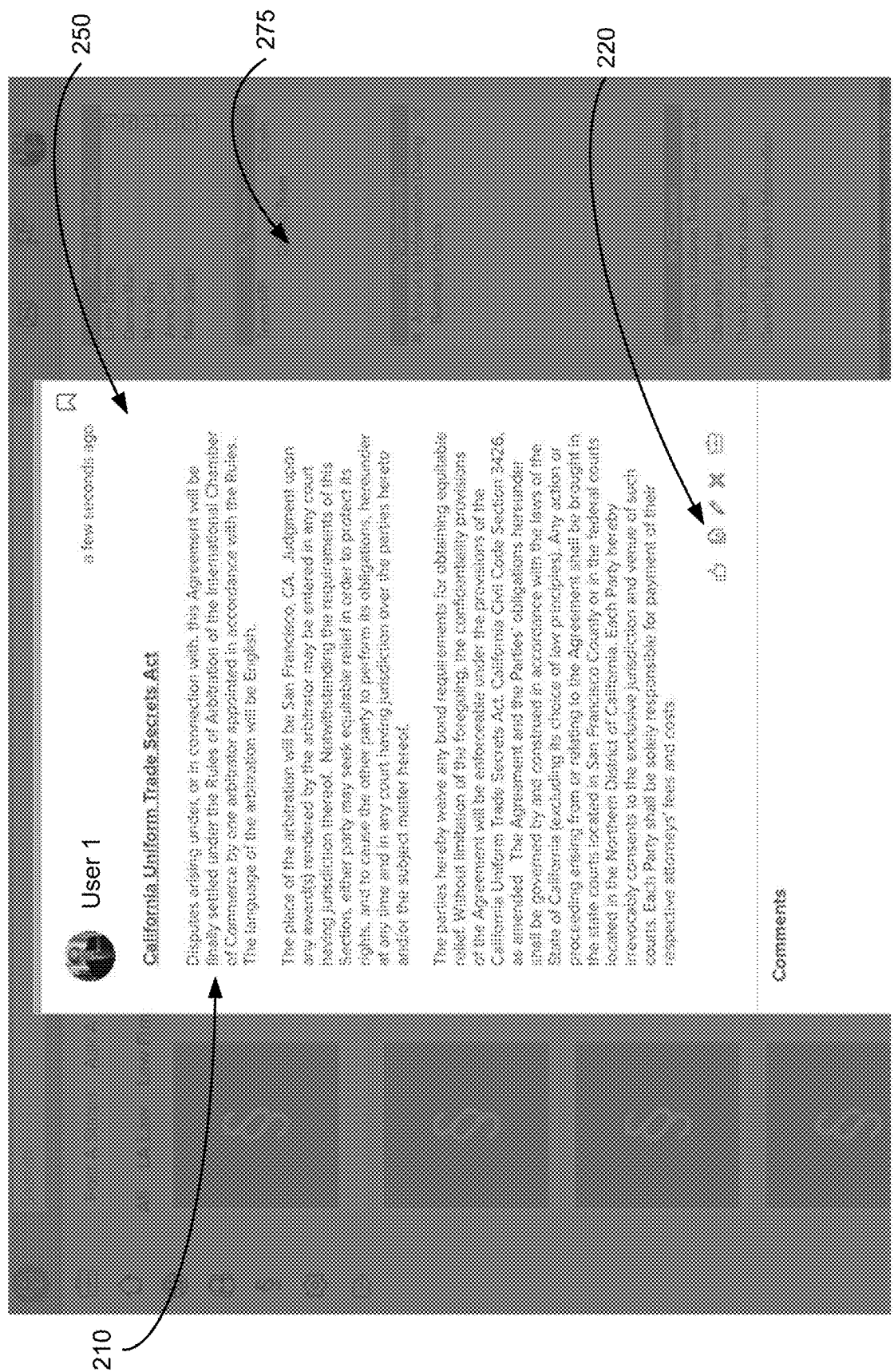
FIG. 2 depicts an example screenshot of a clause, in accordance with an embodiment.

FIG. 2 depicts an example screenshot of a clause 210, in accordance with an embodiment. For example, a first user can provide a clause 210 to a network. Therefore, additional users in the network can access and modify the clause 210. In various embodiments, the user interface 250 provided to a user that accesses the clause 210 includes the text of the clause 210. The text may have a particular formatting (e.g., font, font size, font color, bolded/underlined, and the like). In various embodiments, the user interface 250 may also include selectable options. As depicted in FIG. 2, a selectable option may be a one-click feature 220. If a user selects the one-click feature 220, the formatting of the text of the clause 210 can be fully maintained as is displayed in the user interface 250. The one-click feature is described in further detail below.

In various embodiments, the user interface 250 is a scrollable interface. Thus, a user can provide a user input to scroll the user interface 250 to view additional content. For example, as shown in FIG. 2, the user interface 250 can include a comments section. Therefore, scrolling the user interface 250 downward can show additional comments while moving a portion of the clause 210 off of the depicted user interface 250.

In various embodiments, the user interface 250 is provided for viewing by being overlaid on top of a different web page 275. In one embodiment, the different web page is a home page of a default network. For example, the home page of the default network can provide user with access to other uploaded clauses and other users of the default network. Therefore, a user can view the initial clause 210 on the user interface 250 while also having visual access to portions of the default network home page.

Figure 3:
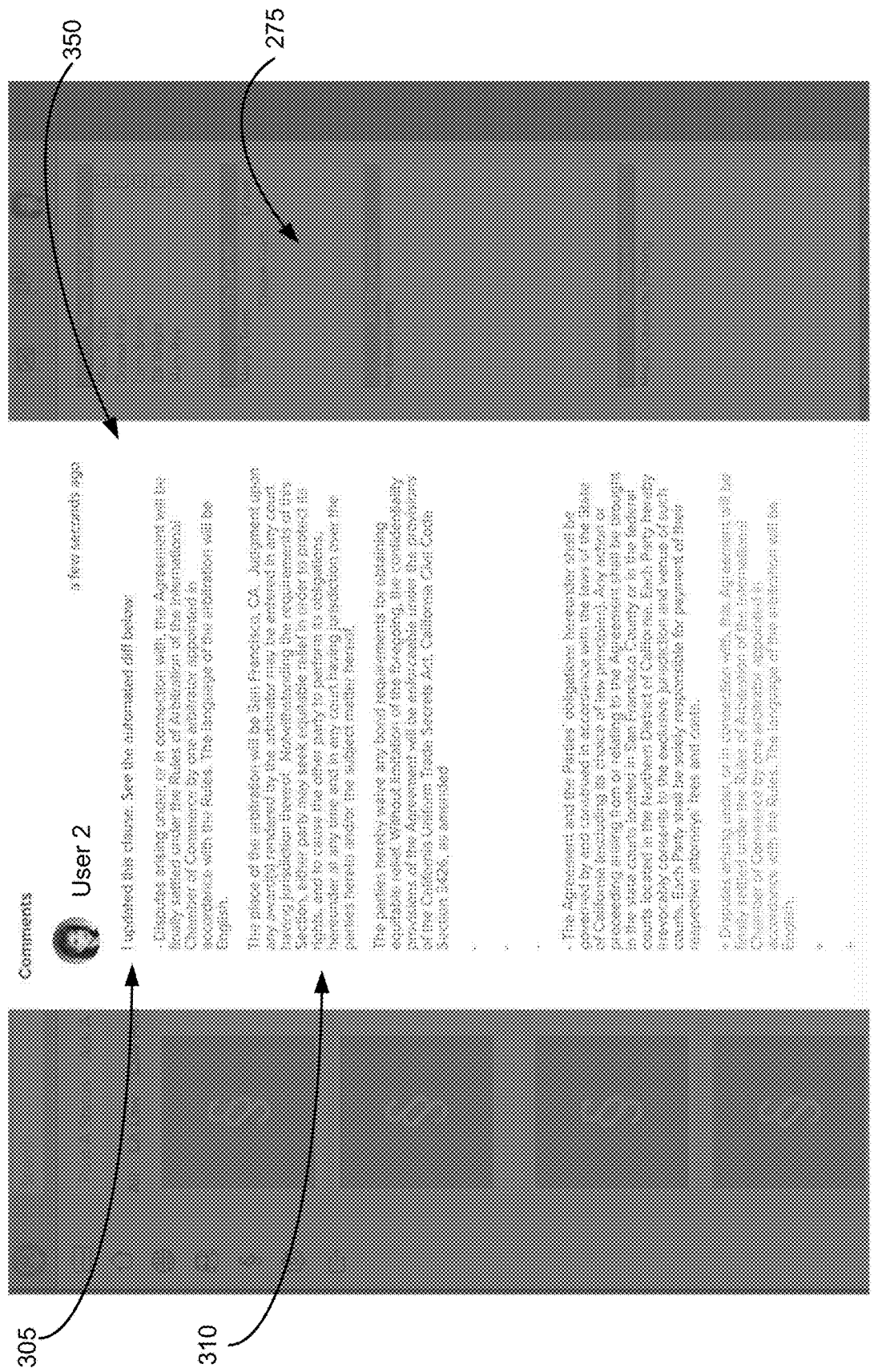
FIG. 3 depicts an example screenshot of a second clause version 310, in accordance with an embodiment.

An additional user can edit the clause 210 to generate a second clause version 310. For example, FIG. 3 depicts an example screenshot of a second clause version 310, in accordance with an embodiment. When the additional user edits the initial clause 210, the web browser 110 (see FIG. 1) sends a request with the updated version of the clause such as the second clause version 310. In various embodiments, the request further includes additional information, such as a user comment 305 provided by the additional user.

As shown in FIG. 3, the second clause version 310 can be included on an updated user interface 350. The updated text may be depicted in a different color. Other differences in formatting to represent the updated text can also be utilized. The text in the second clause version 310 that is unchanged in comparison to the initial clause 210 may be represented with a different formatting. For example, text that is changed may be displayed in a first font color (e.g., green) whereas unchanged text is displayed in a second color (e.g., red). As another example, text that is added is displayed in a first font color (e.g., green), text that is removed is displayed in a second color (e.g., red), and text that is unchanged is displayed in a third color (e.g., black). In various embodiments, the user interface depicting the second clause version 310 may also include a set of selectable options (not shown). For example, the selectable option may also be a one-click feature that, when selected by the user, copies the second clause version 310 while also maintaining the formatting of the second clause version 310.

In various embodiments, when the clause 210 is updated to the second version clause 310, a user is only able to edit the latest version (e.g., the second version clause 310). The older version is disabled and unavailable for editing. The user can only see the difference (what has been modified, which paragraph has been added, which one is removed) between the latest version and prior versions.

Figure 4:
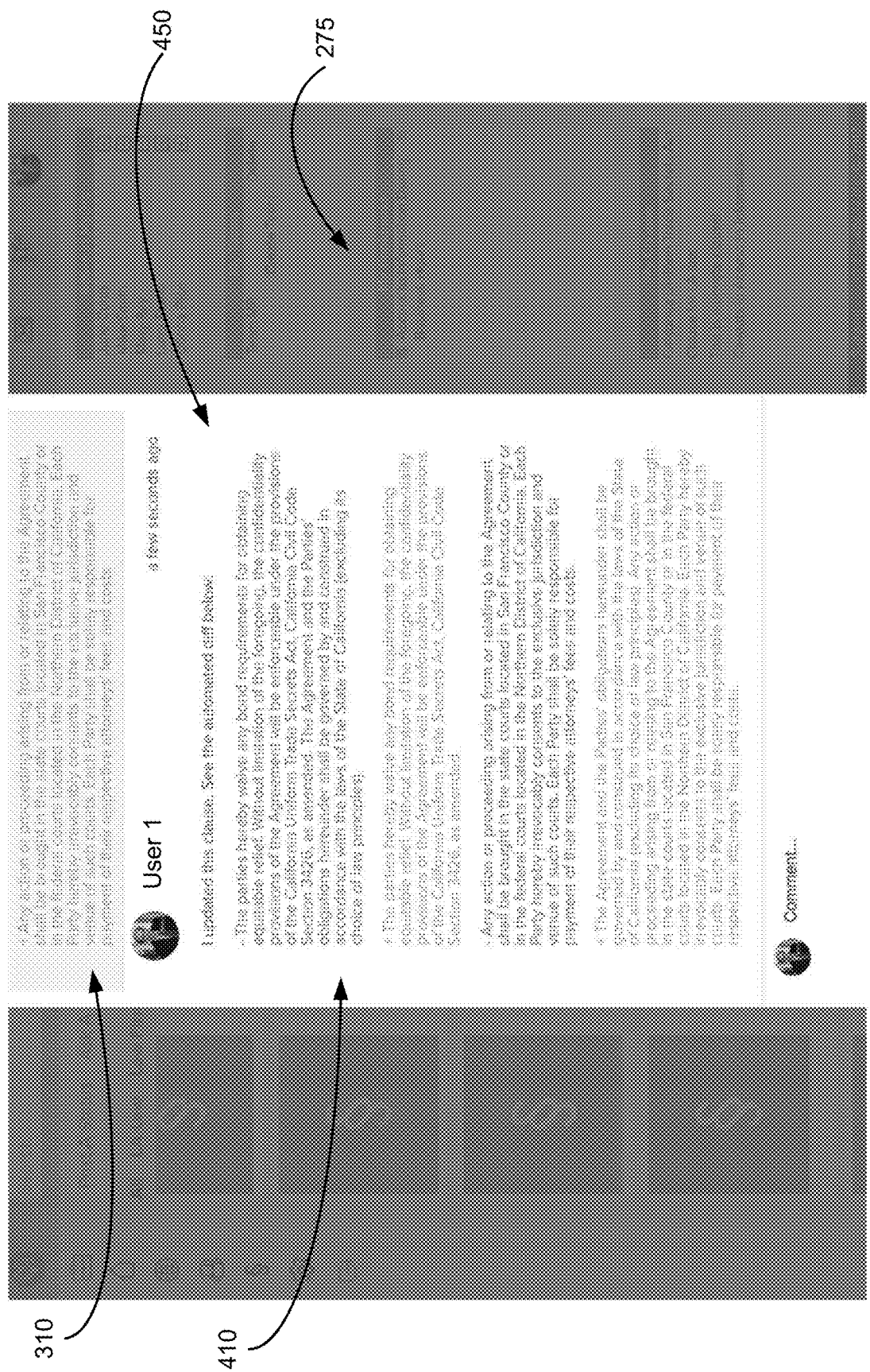
FIG. 4 depicts an example screenshot of a third clause version 410, in accordance with an embodiment.

FIG. 4 depicts an example screenshot of a third clause version 410, in accordance with an embodiment. Here, the third clause version 410 can be included on an updated user interface 450. FIG. 4 depicts the changes in the text that was updated form the second clause version 310 to the third clause version 410. Namely, the added text may have a first formatting, the deleted text may have a second formatting, and the unchanged text can be represented in a different formatting. In various embodiments, the third clause version 410 may be displayed with text formatting changes that also show the changes of the third clause version 410 in relation to the first clause version 210. Additionally, in various embodiments, the user interface 450 depicting the third clause version 410 may also include a set of selectable options (not shown). For example, the selectable option may also be a one-click feature that, when selected by the user, copies the third clause version 410 while also maintaining the formatting of the second clause version 410.

In various embodiments, each version of the clause (e.g., third clause version 410, second clause version 310, and initial clause 210) can be displayed on the user interface 450. For example, FIG. 4 depicts the third clause version 410 immediately below the second clause version 310. As such, the second version 310 may also be immediately below the initial clause 210. In various embodiments, the user interface 450 is a scrollable interface. Therefore, the user interface 450 can scroll in response to a user input to show additional information. For example, the user interface 450 can scroll upward to show a portion of the second clause version 310 while moving a portion of the third clause version 310 downward off of the user interface 450.

One-Click Feature

Figure 5:
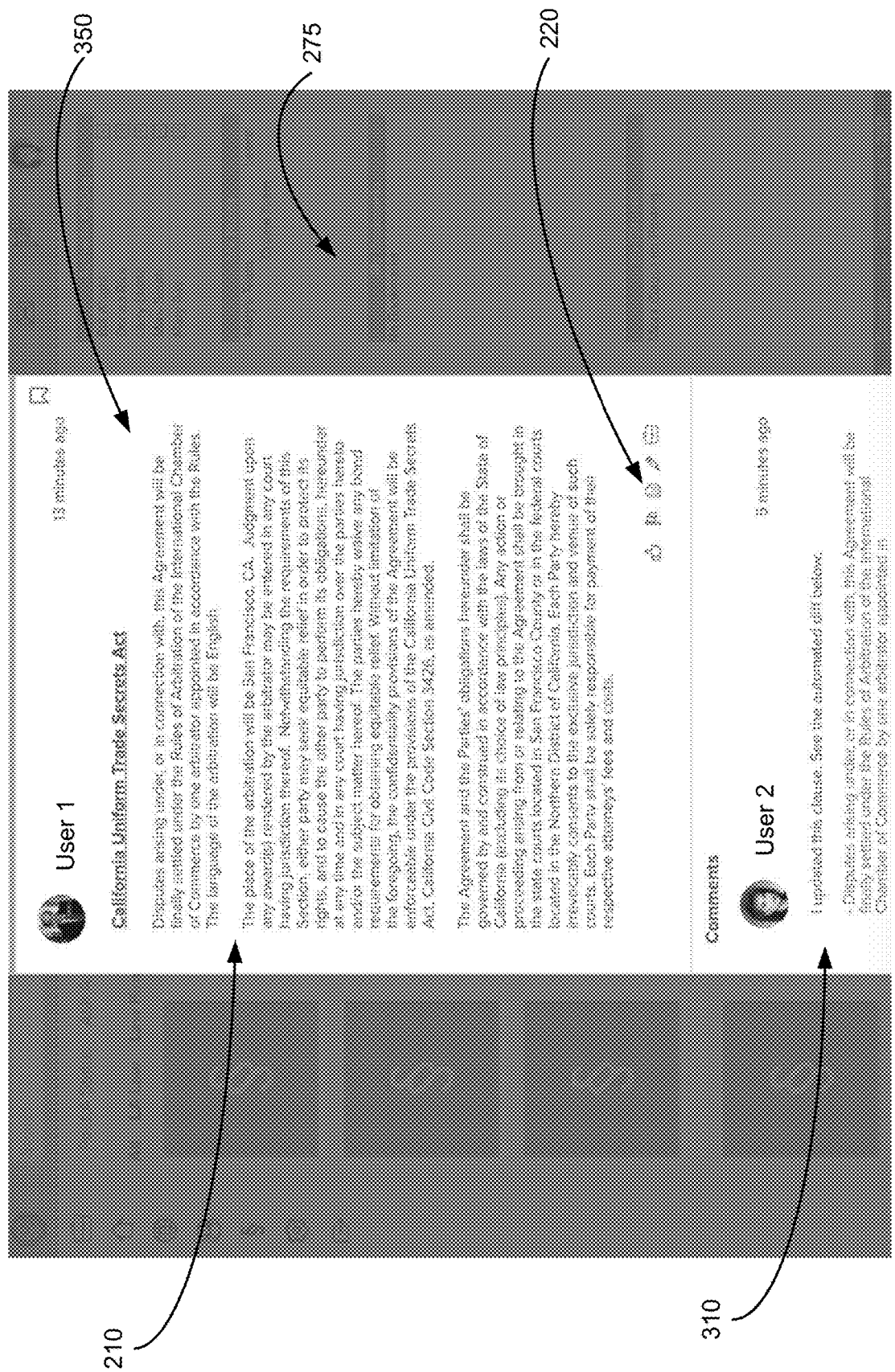
FIG. 5 depicts the original clause after subsequent versions of the clause have been generated, in accordance with an embodiment.

Referring to the one-click feature 220 that was previously shown in FIG. 2, the one-click feature 220 enables a user to select the icon and then paste the clause, fully formatted, in its entirety, into any external application. The one-click function provides very smooth user experience to display and edit the clause simply with a one-click button. In various embodiments, the one-click feature 220 is enabled only for a particular version of the clause. FIG. 5 depicts the initial clause 210 after subsequent versions of the clause, such as a second clause version 310, have been generated, in accordance with an embodiment. In one embodiment, the initial clause 210 and the second clause version 310 may be shown on a user interface 350, such as the user interface 350 also shown in FIG. 3. Here, the user interface 350 may have been scrolled upward to transition from the user interface 350 shown in FIG. 3 to the user interface 350 shown in FIG. 5. Specifically, as a result of the upward scroll, FIG. 5 depicts the initial clause 210 and a portion of the second clause version 310.

As shown in FIG. 5, the one-click feature 220 corresponding to the initial clause 210 is disabled. A disabled one-click feature 220 button may be depicted differently (e.g., different color, removed altogether, and the like). Therefore, users do not use an earlier (and potentially incorrect) version of the language when using the one-click feature. The second clause version 310 shown in FIG. 5 may be the up-to-date version of the initial clause 210. Therefore, the user interface 350 may also include a selectable one-click feature for the second clause version 310 that is enabled (not shown).

In various embodiments, in order to enable the one click feature only on the latest version of the clause, a browser on the client device polls the server. If a user changes the clause, the client device sends a poll to the server to update the clause with the latest version. A poll is an HTTP request from the browser of the client device to the server to ask for the latest information. The poll only returns the latest information when there are changes on the clause. When the server receives the poll request, it will look up on Elastic Search to pull the latest version available. The response of the poll request will be in JSON format and contains all of the metadata (such as latest content, time the clause has been modified) and it will reflect to the UI Decorator.

Example Machine Architecture

Figure 6:
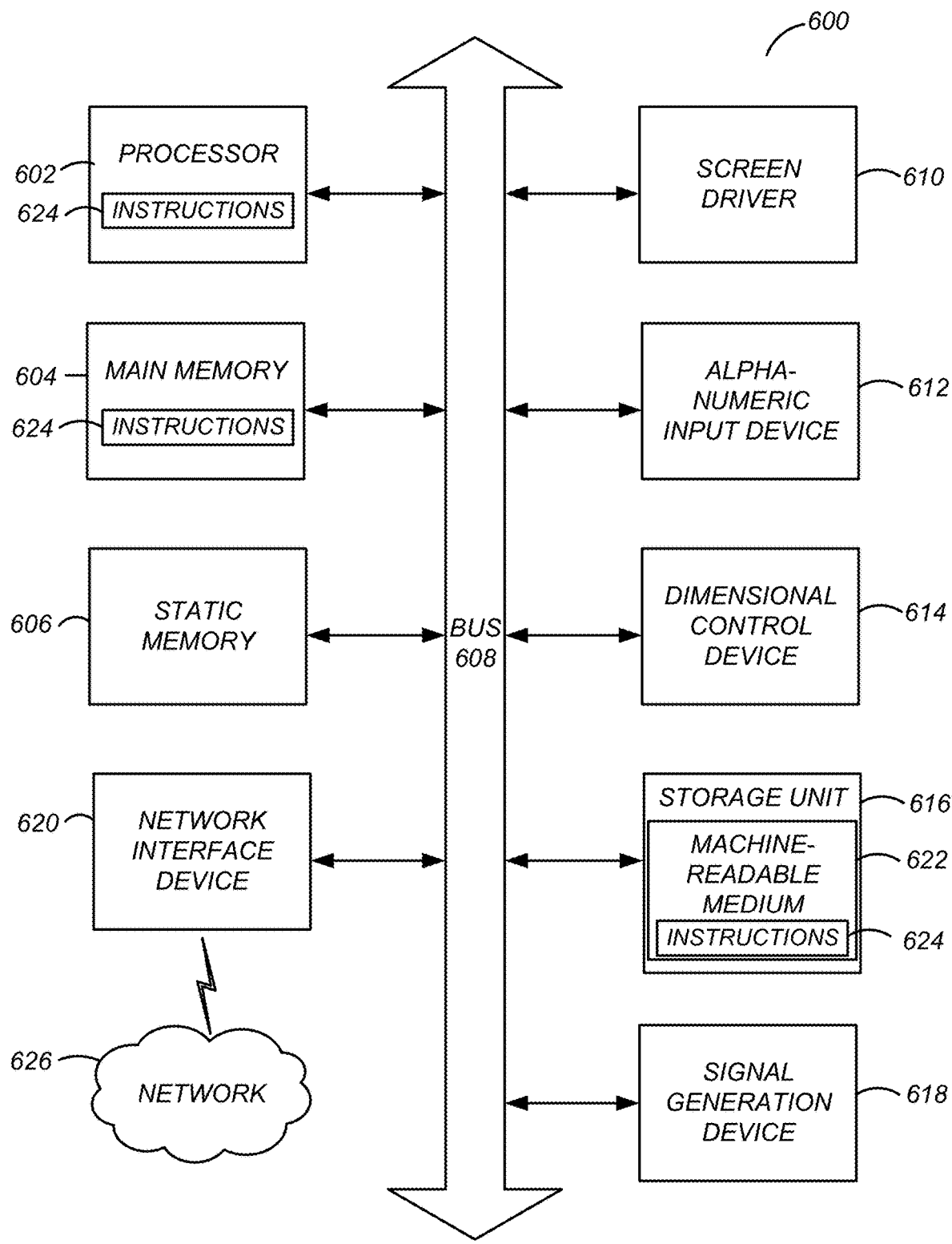
FIG. 6 depicts a diagrammatic representation of a machine in the example form of a computing system, in accordance with an embodiment.

In FIG. 6 there is a diagrammatic representation of a machine in the example form of a computing system 600. The computing system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine (e.g., to maintain or handle the requests of the collaboration platform server) or a client machine (e.g., a user's client device that accesses the collaboration platform server) in a server-client network environment, or as a peer machine in a peer-to-peer (or distributed) network environment.

Example computer systems include a server computer, a client computer, a personal computer (PC), a tablet PC, a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a screen driver 610 (e.g., to drive screen, e.g., such as a plasma display panel (PDP), a liquid crystal display (LCD), or a projector). The computer system 600 may also include input/output devices, e.g., an alphanumeric input device 612 (e.g., a keyboard), a dimensional (e.g., 2-D or 3-D) control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A computer-implemented method comprising:
   providing to a client device, for viewing by a user of an online system, a user interface comprising:
      content including an initial version of a clause including text from a different user of the online system; and
      a first single action selectable button overlaid next to the text of the initial version of the clause and being displayed as enabled for copying the text of the initial version of the clause;
   receiving, from the client device, an updated version of the clause from the user of the online system, the updated version of the clause including modified text; and
   providing for display to the client device an updated version of the user interface corresponding to a historical record of modifications to the clause, wherein the historical record is displayed as showing updates to the initial version of the clause, the updated version of the user interface further comprising:
      the initial version of the clause with the first single action selectable button removed;
      the updated version of the clause including the modified text; and
      a second single action selectable button overlaid next to the modified text of the updated version of the clause and being displayed as enabled for copying the modified text of the updated version of the clause.

2. The computer-implemented method of claim 1, further comprising:
   determining a subset of the modified text not included in the text of the initial version of the clause; and
   providing for display, in the updated version of the user interface, the subset of the modified text in a first color different than a color of remaining text of the modified text.

3. The computer-implemented method of claim 2, further comprising:
   determining a subset of the text of the initial version of the clause to be removed from the modified text; and
   providing for display, in the updated version of the user interface, the subset of the text of the initial version of the clause in a second color different than the first color and the color of remaining text of the modified text.

4. The computer-implemented method of claim 3, wherein the first color is green, the second color is red, and the color of remaining text of the modified text is black.

5. The computer-implemented method of claim 1, wherein the single action is a one-click.

6. The computer-implemented method of claim 1, further comprising:
   determining a subset of the modified text not included in the text of the initial version of the clause;
   providing for display, in the updated version of the user interface, the subset of the modified text in a first formatting;
   determining a subset of the text of the initial version of the clause to be removed from the modified text; and
   providing for display, in the updated version of the user interface, the subset of the text of the initial version of the clause in a second formatting different than the first formatting.

7. The computer-implemented method of claim 6, wherein the first formatting and the second formatting are different than a formatting of the text of the initial version of the clause.

8. A non-transitory computer-readable storage medium storing instructions, the instructions when executed by a processor causing the processor to:
   provide to a client device, for viewing by a user of an online system, a user interface comprising:
      content including an initial version of a clause including text from a different user of the online system; and
      a first single action selectable button overlaid next to the text of the initial version of the clause and being displayed as enabled for copying the text of the initial version of the clause;
   receive, from the client device, an updated version of the clause from the user of the online system, the updated version of the clause including modified text; and
   provide for display to the client device an updated version of the user interface corresponding to a historical record of modifications to the clause, wherein the historical record is displayed as showing updates to the initial version of the clause, the updated version of the user interface further comprising:
      the initial version of the clause with the first single action selectable button removed;
      the updated version of the clause including the modified text; and
      a second single action selectable button overlaid next to the modified text of the updated version of the clause and being displayed as enabled for copying the modified text of the updated version of the clause.

9. The non-transitory computer-readable storage medium of claim 8, the instructions when executed by the processor causing the processor to:
   determine a subset of the modified text not included in the text of the initial version of the clause; and
   provide for display, in the updated version of the user interface, the subset of the modified text in a first color different than a color of remaining text of the modified text.

10. The non-transitory computer-readable storage medium of claim 9, the instructions when executed by the processor causing the processor to:
   determine a subset of the text of the initial version of the clause to be removed from the modified text; and
   provide for display, in the updated version of the user interface, the subset of the text of the initial version of the clause in a second color different than the first color and the color of remaining text of the modified text.

11. The non-transitory computer-readable storage medium of claim 10, wherein the first color is green, the second color is red, and the color of remaining text of the modified text is black.

12. The non-transitory computer-readable storage medium of claim 8, wherein the single action is a one-click.

13. The non-transitory computer-readable storage medium of claim 8, the instructions when executed by the processor causing the processor to:
determine a subset of the modified text not included in the text of the initial version of the clause;
provide for display, in the updated version of the user interface, the subset of the modified text in a first formatting;
determine a subset of the text of the initial version of the clause to be removed from the modified text; and
provide for display, in the updated version of the user interface, the subset of the text of the initial version of the clause in a second formatting different than the first formatting.

14. The non-transitory computer-readable storage medium of claim 13, wherein the first formatting and the second formatting are different than a formatting of the text of the initial version of the clause.

15. A system comprising:
an editor configured to provide to a client device, for viewing by a user of an online system, a user interface comprising:
content including an initial version of a clause including text from a different user of the online system; and
a first single action selectable button overlaid next to the text of the initial version of the clause and being displayed as enabled for copying the text of the initial version of the clause; and
a collaboration platform configured to receive, from the client device, an updated version of the clause from the user of the online system, the updated version of the clause including modified text;
wherein the editor is further configured to provide for display to the client device an updated version of the user interface corresponding to a historical record of modifications to the clause, wherein the historical record is displayed as showing updates to the initial version of the clause, the updated version of the user interface further comprising:
the initial version of the clause with the first single action selectable button removed;
the updated version of the clause including the modified text; and
a second single action selectable button overlaid next to the modified text of the updated version of the clause and being displayed as enabled for copying the modified text of the updated version of the clause.

16. The system of claim 15,
wherein the collaboration platform is further configured to determine a subset of the modified text not included in the text of the initial version of the clause; and
wherein the editor is further configured to provide for display, in the updated version of the user interface, the subset of the modified text in a first color different than a color of remaining text of the modified text.

17. The system of claim 16,
wherein the collaboration platform is further configured to determine a subset of the text of the initial version of the clause to be removed from the modified text; and
wherein the editor is further configured to provide for display, in the updated version of the user interface, the subset of the text of the initial version of the clause in a second color different than the first color and the color of remaining text of the modified text.

18. The system of claim 17, wherein the first color is green, the second color is red, and the color of remaining text of the modified text is black.

19. The system of claim 15, wherein the single action is a one-click.

20. The system of claim 15,
wherein the collaboration platform is further configured to:
determine a subset of the modified text not included in the text of the initial version of the clause; and
determine a subset of the text of the initial version of the clause to be removed from the modified text; and
wherein the editor is further configured to:
provide for display, in the updated version of the user interface, the subset of the modified text in a first formatting; and
provide for display, in the updated version of the user interface, the subset of the text of the initial version of the clause in a second formatting different than the first formatting.

* * * * *